United States Patent [19]

Pies

[11] 4,095,584
[45] Jun. 20, 1978

[54] SOLAR HEATING SYSTEM

[76] Inventor: Othmar W. Pies, 7041 Vine St., Cincinnati, Ohio 45216

[21] Appl. No.: 705,079

[22] Filed: Jul. 14, 1976

[51] Int. Cl.² ............................................. F24J 3/02
[52] U.S. Cl. .................... 126/270; 237/1 A; 126/400
[58] Field of Search ............... 126/270, 271, 400; 237/1 A; 165/48

[56] References Cited

U.S. PATENT DOCUMENTS

| 1,130,871 | 3/1915 | Willsie | 126/271 |
| 3,106,201 | 10/1963 | Steinberg | 126/270 |
| 3,957,109 | 5/1976 | Worthington | 126/270 |
| 4,000,851 | 1/1977 | Heilemann | 126/400 |
| 4,010,731 | 3/1977 | Harrison | 126/400 |

OTHER PUBLICATIONS

"Fully Heated Solar House", Air Conditioning, Heating and Ventilation, Oct. 1955, pp. 92-97.

Primary Examiner—Kenneth W. Sprague
Assistant Examiner—James C. Yeung
Attorney, Agent, or Firm—James W. Pearce; Roy F. Schaeperklaus

[57] ABSTRACT

A solar heating system which includes a heat accumulating structure and a heat storage pit. A roof of the heat accumulating structure includes a backing board and a corrugated metal plate mounted on and overlying the backing board to form air heating channels between the backing board and the metal plate. Air is directed along the air heating channels to be heated when the sun shines on the metal plate. The heated air is directed from the channels of the roof through the chamber to heat rocks in the chamber.

4 Claims, 8 Drawing Figures

SOLAR HEATING SYSTEM

This invention relates to a solar heating system. More particularly, this invention relates to a device for heating air under an exposed metal roof panel and for storing the heat.

An object of this invention is to provide a heating system in which air is passed along channels in corrugated metal roof panels of a structure with the metal exposed to the sun so that the air is heated.

A further object of this invention is to provide a rock filled heat storage chamber through which the heated air is directed so that the rocks in the heat storage chamber are heated.

A further object of this invention is to provide means for circulating air between the heat storage chamber and a house or the like to heat the house.

Briefly, this invention provides a heat accumulating structure and a heat storage chamber. The heat accumulating structure can be a building having a roof which includes a flat backing board or block of insulating material and a corrugated metal sheet covering the backing board and forming channels between the backing board and the corrugated metal sheet. Air is circulated along the channels when there is sunlight on the sheet so that the air is heated. The heated air is directed to the heat storage chamber. The heat storage chamber can be a pit which is provided with a water impervious lining to prevent entry of ground water. The pit is filled with gravel or rocks, which can be of the size of chicken eggs, to provide spaces between rocks through which the heated air circulates to heat the rocks. From the heat storage chamber, the air can be returned to the channels. When heat is required, as to heat a house, air can be pumped through the heated rocks to be heated thereby, and the air can be circulated through the house to heat the house.

The above and other objects and features of the invention will be apparent to those skilled in the art to which this invention pertains from the following detailed description and the drawings, in which.

In the following detailed description and the drawings, like reference characters indicate like parts.

Figure 1:
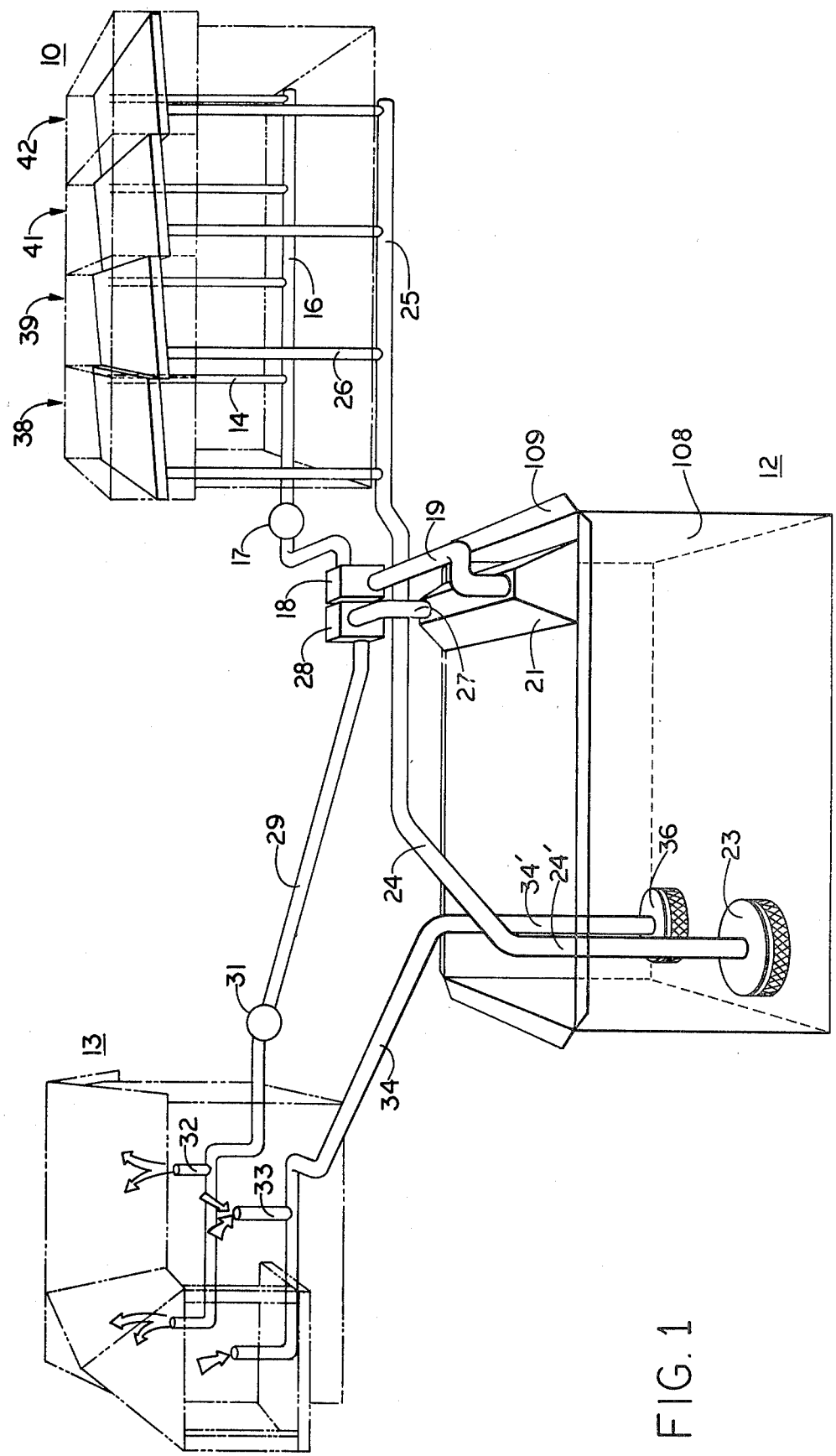
FIG. 1 is a schematic perspective view showing a heating system constructed in accordance with an embodiment of this invention, a heat accumulating structure and a house being shown in double-dot-dash lines, a heat storage pit being shown before filling with rocks.
Figure 2:
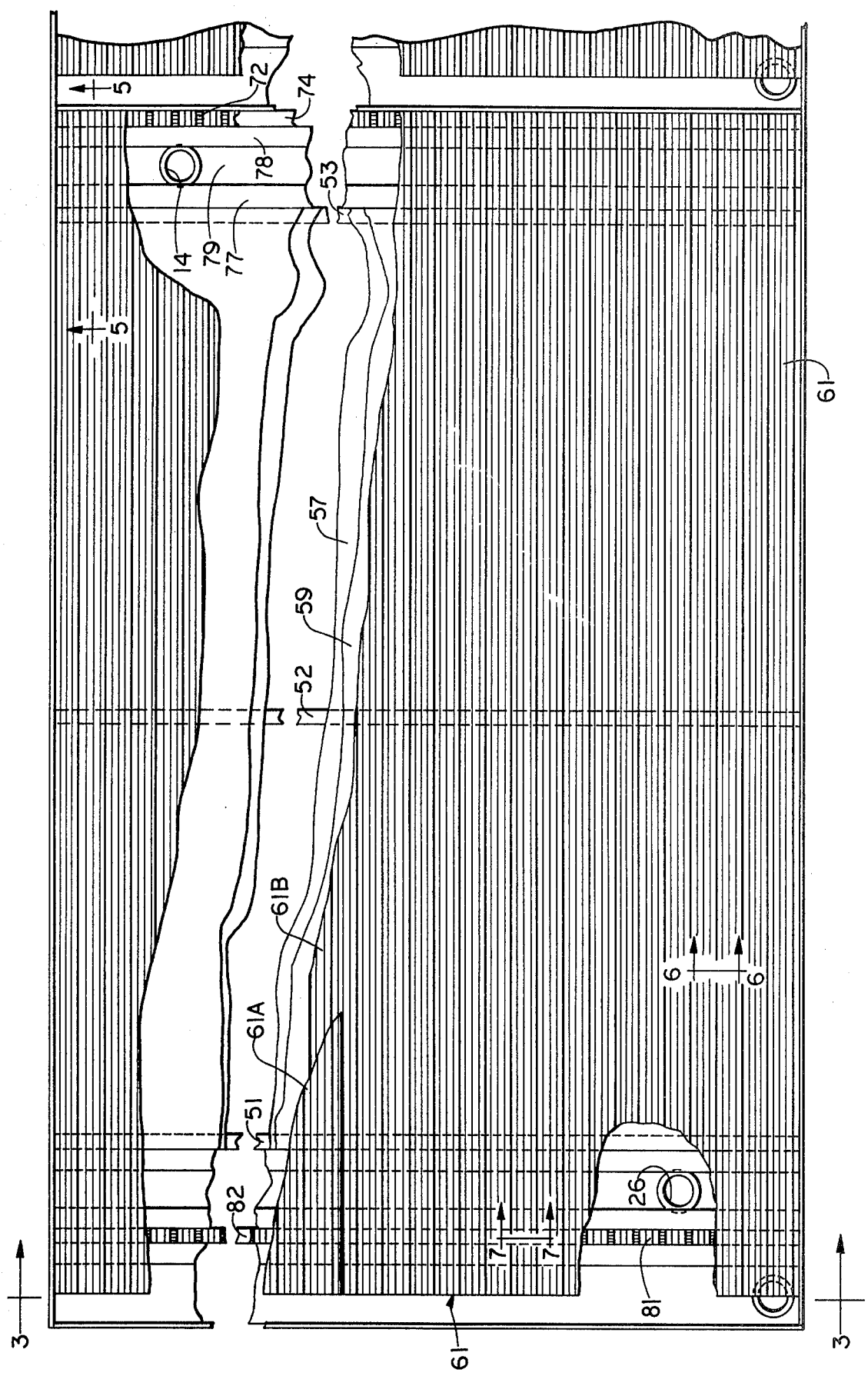
FIG. 2 is a fragmentary plan view of the heat accumulating structure, parts of corrugated panels thereof being broken away to reveal details of structure.
Figure 3:
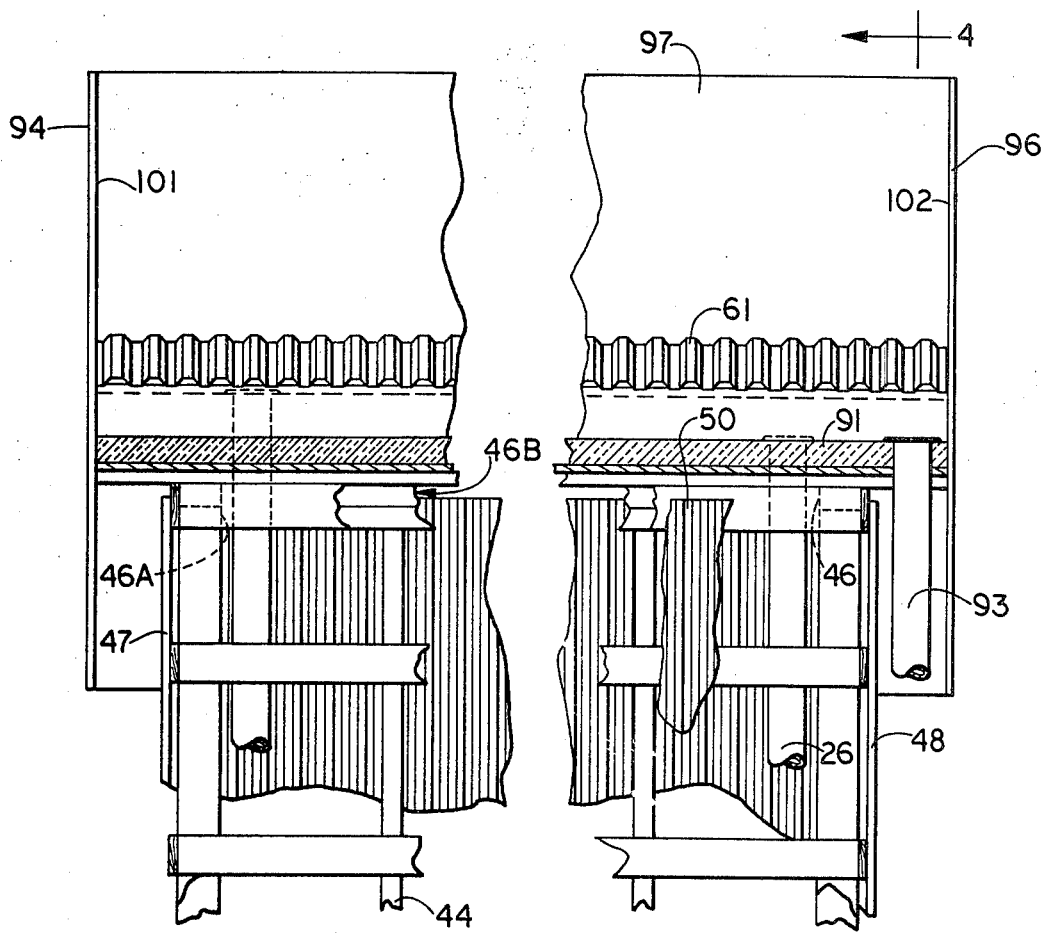
FIG. 3 is a fragmentary view in section taken on the line 3—3 in FIG. 2, a wall panel being broken away to reveal details of structure.

In FIG. 1 is shown a solar heating system constructed in accordance with an embodiment of this invention.

The system includes a heat accumulating structure 10, a heat storage chamber 12, and a heated building 13. Heated air is drawn from the heat accumulating structure 10 through upright pipes 14, a collecting line 16, and a valve 17 by a pump 18 which discharges heated air through a line 19 to a header 21. The header 21 discharges the heated air into the heat storage chamber 12, which can be filled with rocks 22 (FIG. 8) so that the heated air heats the rocks 22. The rocks can be of the size of chicken eggs, and the air can circulate between the rocks. The air can return from the heat storage chamber 12 through a screened entry member 23, a line or pipe 24, a manifold 25 and upright pipes 26 connected to the manifold 25. When the building 13 is to be heated, air is drawn from the header 21 through a line 27 by a pump 28 and is pumped through a line 29 and a valve 31 to heating ducts 32 inside the building 13. From the building 13, the air returns through return ducts 33 and a line or pipe 34 to a screened discharge member 36 inside the heat storage chamber 12.

Figure 4:
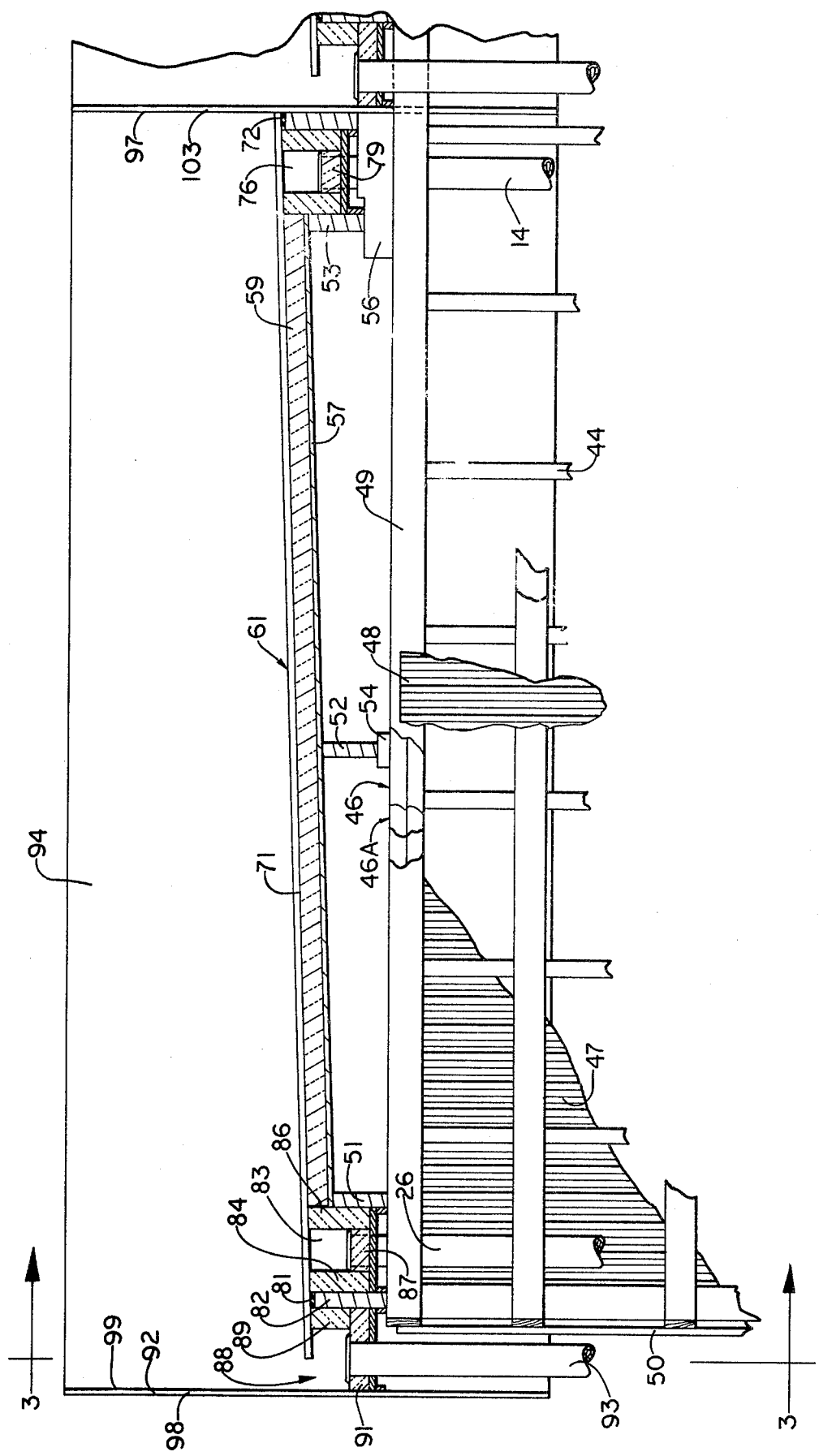
FIG. 4 is a fragmentary view in section taken on the line 4—4 in FIG. 3, wall panels being broken away to reveal details of structure.
Figure 5:
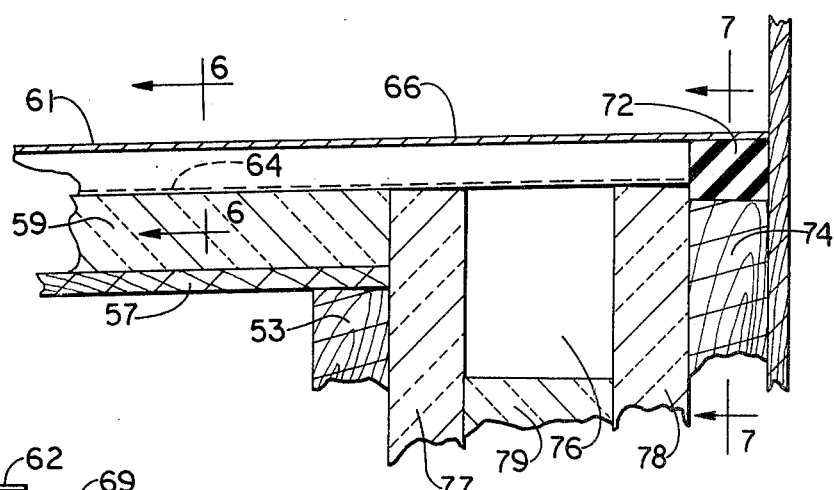
FIG. 5 is a view in section taken on an enlarged scale on the line 5—5 in FIG. 2.
Figure 6:
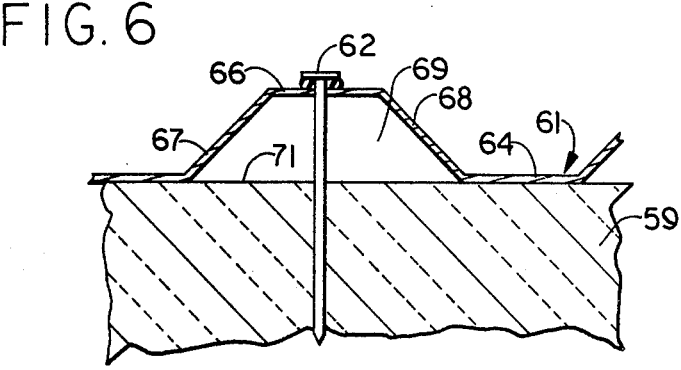
FIG. 6 is a view in section taken on an enlarged scale on the line 6—6 in FIG. 5.
Figure 7:
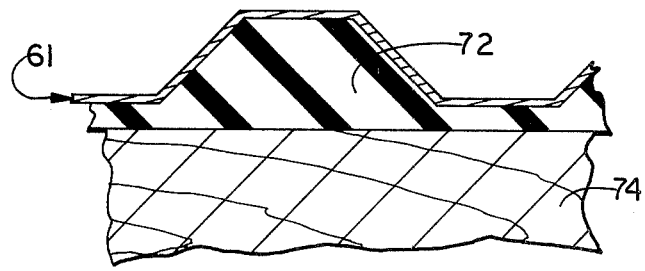
FIG. 7 is a view in section taken on an enlarged scale on the line 7—7 in FIG. 5.

Details of structure of the heat accumulating structure 10 are shown in FIGS. 2-7 inclusive. As shown in FIG. 1, the roof portion of the heat accumulating structure 10 includes a plurality of sections 38, 39, 41 and 42, and only the section 38 will be described in detail, the other sections being similar. As shown in FIG. 4, the heat accumulating structure includes upright studs 44 which support horizontal lengthwise header assemblies 46 and 46A and transverse header assemblies 46B (only one of which is shown, FIG. 3) in the usual fashion. Side wall panels 47 and 48 (FIG. 3) are mounted on appropriate support strips 49 carried by the studs. End wall panels 50 are similarly mounted. Beams 51, 52 and 53 (FIG. 4) span the lengthwise header assemblies 46 and 46A. The beams 52 and 53 are supported on spacer shims 54 and 56, respectively. Plywood sheathing 57 is mounted on the beams 51, 52 and 53, and the plywood sheathing slopes as shown in FIG. 4. On the plywood sheathing is mounted an insulation block or backing panel 59 having a flat upper face 71. On top of the insulation block or backing panel 59 is mounted a corrugated metal roofing panel 61 including sections 61A and 61B (FIG. 2), which are attached to the insulation block 59 by appropriate fasteners 62 (FIG. 6). The panel 61 can be formed of aluminum. Upper faces of the sections of the panel 61 can be provided with a coating of dark or black color to make them absorb heat.

As shown in FIG. 6, the corrugated metal roofing panel 61 is formed with flat strip portions 64 and raised strip portions 66 which are linked by sloping strip portions 67 and 68. A plurality of elongated channels 69 is formed between the raised strip portions 66 and the flat upper face 71 of the insulating block or backing panel 59. Upper and lower end portions of the panel 61 project beyond ends of the backing panel 59, as shown in FIG. 4. Upper ends of the elongated channels 69 are closed by a gasket 72 (FIGS. 5 and 7), which rests on a cross member or beam 74. The upper face of the gasket 72 conforms to the interior of the roofing panels to form a seal therewith. As shown in FIG. 5, a transverse header channel 76 is formed under the roofing panel 61 and in communication with the channels 69 adjacent the gasket 72. The transverse header channel 76 is formed between transverse insulation block members 77 and 78, which engage the flat strip portions 64 of the roofing panel 61. A transverse insulation block 79 forms a lower wall for the transverse header channel 76. An upper end of one of the upright pipes 14 (Fig. 4) extends through an opening in the block 79 and communicates with the interior of the transverse channel 76.

In a similar manner, lower end portions of the elongated channels 69 are closed by a gasket 81, which is mounted on a transverse member or beam 82. A transverse header channel 83 communicates with the lower end portions of the elongated channels 69. Side walls of the transverse header channel 83 are defined by transverse insulation blocks 84 and 86. A transverse insulation block member 87 forms a lower wall for the transverse header channel 83. One of the upright pipes 26 extends through an opening in the transverse insulating block member 87 and communicates with the interior of the transverse channel 83. Lower end portions of the roofing panels 61 extend beyond the gasket 81 to discharge rain water into a transverse rain trough 88, which is defined by transverse blocks 89 and 91 and a portion of an upright end windbreak wall member 92. The rain trough 88 can be provided with an appropriate gutter liner (not shown). A downspout 93 receives rain water from the transverse rain trough 88.

The upright end windbreak wall member 92 is supported by upright lengthwise windbreak wall members 94 and 96, which are mounted on ends of the beams 51, 52 and 53. The upright windbreak wall members 92, 94 and 96 and an upright transverse windbreak wall member 97, which is mounted adjacent the gasket 72, form an enclosure extending upwardly around the roofing panels 61 to shield them from wind. The roofing panels 61 can be formed of aluminum or the like and can be provided with a dark or black coating on the exposed upper face thereof. An outer face 98 of the end windbreak wall member 92 can face south. An inner face 99 thereof, which faces north, can be provided with a white or reflective coating. Inner faces 101 and 102 of the windbreak wall panels 94, 96 and a south facing face 103 of the transverse windbreak wall panel 97 can be provided with a reflective aluminum facing, not shown.

Figure 8:
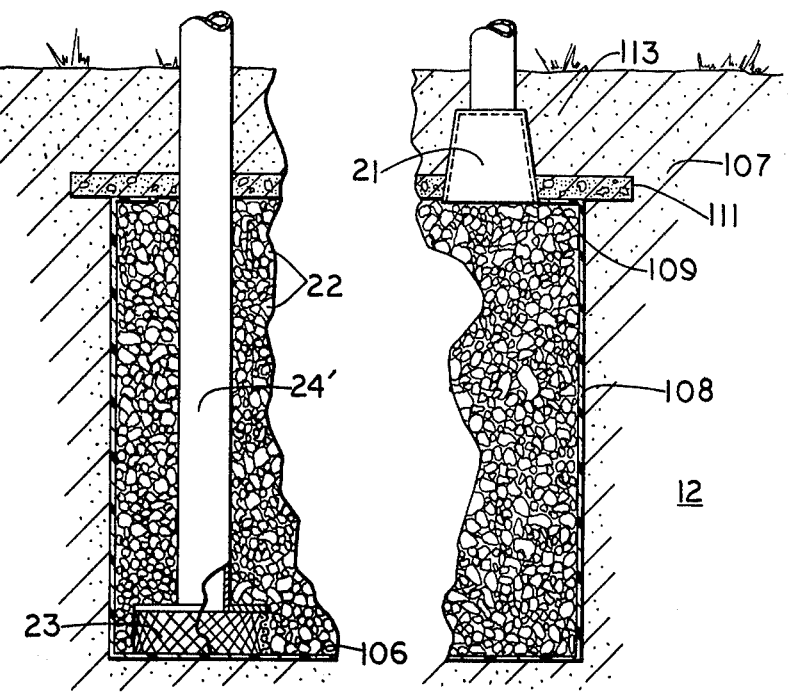
FIG. 8 is a view in upright section through a heat storage chamber of the system.

Details of structure of the heat storage chamber 12 are shown in FIGS. 1 and 8. The heat storage chamber 12 can be formed in a pit 106 in the ground 107. The pit 106 is lined with a water and air impervious membrane 108, which can be of the type used to line a swimming pool, such as neoprene or a polyolefin sheet material, and the membrane 108 prevents entry of ground water into the heat storage chamber 12 and prevents escape of air. The screened entry member 23, the screened discharge member 36, and upright sections 24' and 34' of the lines 24 and 34 are set in position, and the interior of the pit 106 inside the membrane 108 is filled with the rocks 22 (FIG. 8). The header 21 is set in position. Edge flange portions 109 of the membrane 108 are turned inwardly over side portions of the pit 106, as shown in FIG. 8, and a slab 111 of concrete is poured overlying the rocks 22 and the edge flanges 109 of the membrane 108 to seal the top of the pit 106. The slab 111 can be covered with a layer of earth 113.

When the sun shines, the valve 17 is opened, and the pump 18 circulates air through the elongated channels 69 between the panels 61 and the insulation block 59 to be heated and through the rocks 22 so that the rocks 22 are heated by the heated air. When the sun is not shining, the pump 18 can be stopped. When heat is required in the building 13, the valve 31 is opened, and air is drawn through the rocks 22 to be heated by the rocks and is pumped to the house to heat the house. The solar heating system can be provided with appropriate controls for stopping a pump 18 and closing the valve 17 when the temperature under the panels 61 falls below a selected temperature.

The solar heating system illustrated in the drawings and described above is subject to modification without departing from the spirit and scope of the appended claims.

Having described my invention, what I claim as new and desire to secure by Letters Patent is:

1. A solar heating system which comprises a heat accumulating structure having a roof including a backing panel, a corrugated metal panel mounted on and overlying the backing panel to form air heating channels between the backing panel and the metal panel, end portions of the metal panel projecting beyond ends of the backing panel, transverse header channels formed under the end portions of the metal panel and in communication with the air heating channels, gasket means for closing ends of the air heating channels outboard of the transverse channels, the gasket means including a block of resilient material having an upper face conforming to and engaging the underside of the metal panel to form a seal therewith to close ends of the air heating channels, means for forming a seal between each block and an associated one of the transverse channels, means for directing air into one of the transverse header channels to be directed along the air heating channels into the other of the transverse header channels so that the air is heated when the sun shines on the metal panel, a heat storage chamber formed in a pit in the ground, the heat storage chamber including an air impervious membrane lining a bottom and side walls of the pit, rocks mounted inside and filling the pit, a concrete slab overlying the rocks and upper edge portions of the membrane, and means for directing heated air from the other transverse channel through the chamber to heat the rocks.

2. A solar heating system as in claim 1 wherein the roof includes upright windbreak panels extending upwardly along edges of the metal panel to form an open-topped enclosure surrounding the metal panel.

3. A solar heating system as in claim 2 wherein sun-facing inner sides of the windbreak panels are provided with reflective faces.

4. A solar heating system as in claim 1 wherein the rocks are of approximately the size of chicken eggs.

* * * * *